United States Patent
Chandrashekar et al.

(10) Patent No.: US 12,081,811 B2
(45) Date of Patent: *Sep. 3, 2024

(54) METHODS AND SYSTEMS FOR DISPLAYING MEDIA CONTENT

(71) Applicant: Rovi Guides, Inc., San Jose, CA (US)

(72) Inventors: Padmassri Chandrashekar, Karnataka (IN); Daina Emmanuel, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,609

(22) Filed: May 1, 2023

(65) Prior Publication Data
US 2023/0269406 A1   Aug. 24, 2023

Related U.S. Application Data

(63) Continuation of application No. 17/353,157, filed on Jun. 21, 2021, now Pat. No. 11,677,992.

(51) Int. Cl.
*H04N 21/234* (2011.01)
*H04N 21/258* (2011.01)
*H04N 21/262* (2011.01)
*H04N 21/845* (2011.01)

(52) U.S. Cl.
CPC . *H04N 21/23424* (2013.01); *H04N 21/25808* (2013.01); *H04N 21/2625* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 11,677,992 B2 | 6/2023 | Chandrashekar et al. | |
| 2004/0070690 A1 | 4/2004 | Holtz et al. | |
| 2004/0267816 A1 | 12/2004 | Russek | |
| 2005/0081239 A1* | 4/2005 | Makowski, Jr. | H04N 21/854 725/35 |
| 2006/0212897 A1 | 9/2006 | Li et al. | |
| 2006/0271953 A1 | 11/2006 | Jacoby et al. | |
| 2007/0101360 A1* | 5/2007 | Gutta | H04N 21/4622 725/35 |
| 2007/0204310 A1 | 8/2007 | Hua et al. | |
| 2008/0229354 A1* | 9/2008 | Morris | H04N 21/26603 348/E7.071 |
| 2009/0222853 A1 | 9/2009 | White et al. | |
| 2011/0179445 A1* | 7/2011 | Brown | H04N 21/812 725/32 |
| 2013/0247080 A1 | 9/2013 | Mnson et al. | |
| 2014/0196085 A1 | 7/2014 | Dunker et al. | |

(Continued)

*Primary Examiner* — Alexander Q Huerta
(74) *Attorney, Agent, or Firm* — Haley Guiliano LLP

(57) ABSTRACT

Systems and methods are described for displaying media content. Media content is displayed on user equipment. A scheduled break in the display of the media content is determined using control circuitry. One or more first parameters of the media content are determined for a predetermined period preceding the scheduled break using control circuitry. Additional media content having one or more second parameters corresponding to the one or more first parameters of the media content is selected from memory. The additional media content is displayed on the user equipment during the scheduled break in the display of the media content.

18 Claims, 7 Drawing Sheets

(56) References Cited

U.S. PATENT DOCUMENTS

| | | |
|---|---|---|
| 2014/0282692 A1 | 9/2014 | Bhat |
| 2015/0052549 A1* | 2/2015 | Teixeira ............ H04N 21/6587 |
| | | 725/32 |
| 2016/0330529 A1* | 11/2016 | Byers ................. G06Q 30/0207 |
| 2022/0408128 A1 | 12/2022 | Chandrashekar et al. |

* cited by examiner

Fig. 4 (Cont I)
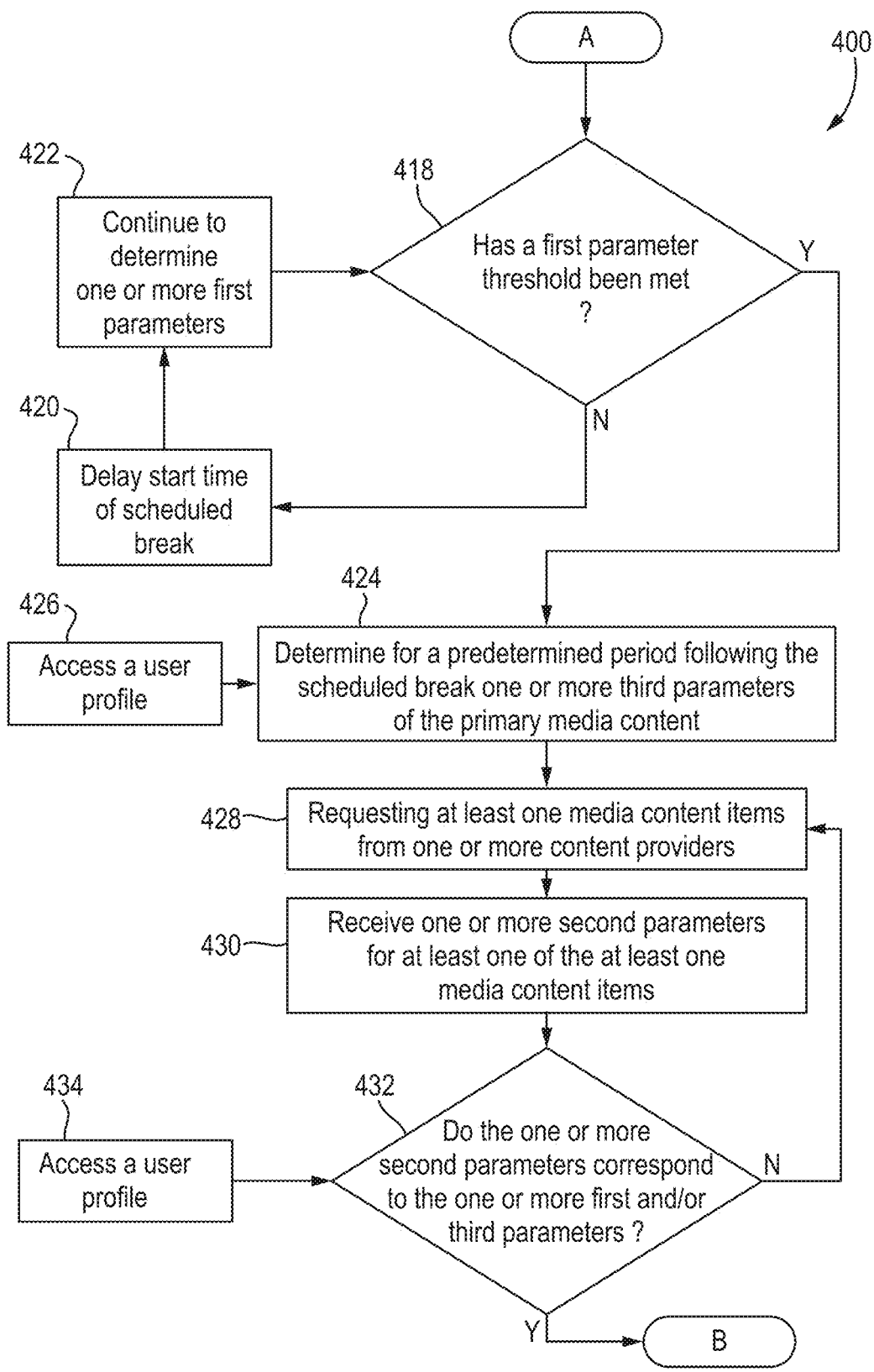

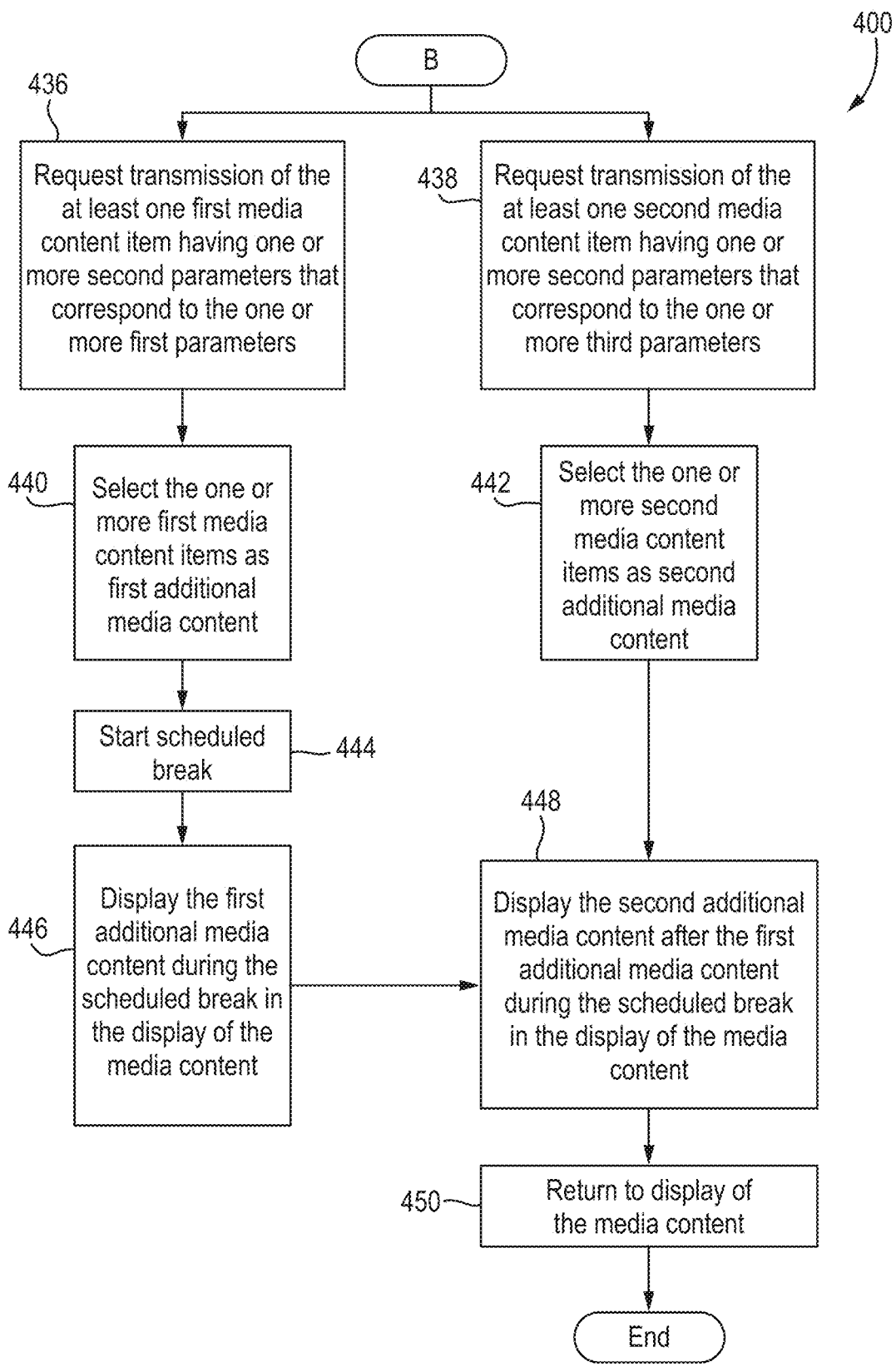
Fig. 4 (Cont II)

METHODS AND SYSTEMS FOR DISPLAYING MEDIA CONTENT

CROSS-REFERENCE TO RELATED APPLICATION

This application is a continuation of U.S. patent application Ser. No. 17/353,157, filed Jun. 21, 2021, which is hereby incorporated by reference herein in its entirety.

BACKGROUND

The present disclosure relates to methods and systems for displaying media content, and in particular, but not exclusively, to providing improved transition between media content items.

SUMMARY

It is common for media content to be broken up into segments or programs. For example, a content provider may separate various programs in a scheduled broadcast or transmission using additional content to demark the transition between different programs or episodes of serial programing. In some cases, a program may be broken up into smaller segments, e.g., where the program is particularly long, by inserting one or more scheduled breaks into the program, which allows for the content provider to insert additional content, such as a trailer or commercial, into the program. However, while some viewers may find a scheduled break in the programing helpful, others may find that the quality of their viewing experience is reduced, e.g., where the additional content is out of the context of the program that they are viewing, and, as a result, may request to skip viewing the additional content.

Systems and methods are provided herein for providing an improved viewing experience, e.g., by managing a contextual flow between main programing and additional content inserted into the main programing.

According to some examples of the systems and methods provided herein, media content, e.g., primary or main media content, is displayed on user equipment. A scheduled break in the display of the media content is identified. For example, a start time and/or a duration of the scheduled break is determined. One or more first parameters of the media content are determined for a predetermined period preceding the scheduled break. Additional media content, e.g., first additional media content, having one or more second parameters corresponding to the one or more first parameters of the media content is selected from memory. The additional media content is displayed on the user equipment during the scheduled break in the display of the media content. In some examples, the level of correspondence, e.g., correlation, between the one or more first parameters and the one or more second parameters relates to the contextual flow between the media content and the additional content. As such, the one or more first parameters and the one or more second parameters may be matched so as to maintain at least some contextual flow between the media content and the additional content (and back to the media content) where the additional content interrupts the viewing of the media content by a viewer.

In some examples, metadata for the media content is obtained, e.g., from one or more third-party content providers. The one or more first parameters of the media content may be based on the metadata.

In some examples, one or more audio and/or visual characteristics of the media content are determined, e.g., for the period of the media content preceding the scheduled break. The one or more first parameters of the media content may be based on the one or more audio and/or visual characteristics.

In some examples, a user profile is accessed, e.g., to obtain data relating to one or more user preferences. The additional media content may be selected at least partially based on the user profile, e.g., one or more settings in the user profile. In some examples, the one or more first parameters of the media content may be weighted based on the user profile. In some examples, the one or more first parameters of the media content may be ranked, e.g., at least partially based on the weighting set by the user profile. In some examples, the predetermined period preceding the scheduled break in the media content is based on the user profile. In some examples, additional media content having one or more second parameters corresponding to the weighting of the one or more first parameters may be selected.

In some examples, a start time of the scheduled break is delayed based on the one or more first parameters. Additionally or alternatively, the duration of the scheduled break may be adjusted, e.g., extended or shortened, based on the one or more first parameters. In some examples, in response to delaying a start time of the scheduled break, one or more first parameters may continue to be determined. In some examples, the scheduled break may be started in response to one or more of the first parameters reaching a first parameter threshold.

In some examples, one or more third parameters of the media content for a predetermined period following the scheduled break may be determined. Additional media content, e.g., second additional media content, having one or more second parameters corresponding to the one or more third parameters of the media content may be selected. In some examples, the second additional media content may be displayed after the first additional media content during the scheduled break in the display of the media content.

In some examples, at least one media content item is requested from one or more content providers, e.g., based on the one or more first parameters. In response to requesting at least one media content item, one or more second parameters for the at least one media content item may be transmitted from a content provider. The one or more second parameters may be compared to the one or more first parameters. Upon determining that the one or more second parameters are within a threshold parameter level of the one or more first parameters, transmission of the at least one media content item is requested. In some examples, the at least one additional media content item is selected as the additional media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
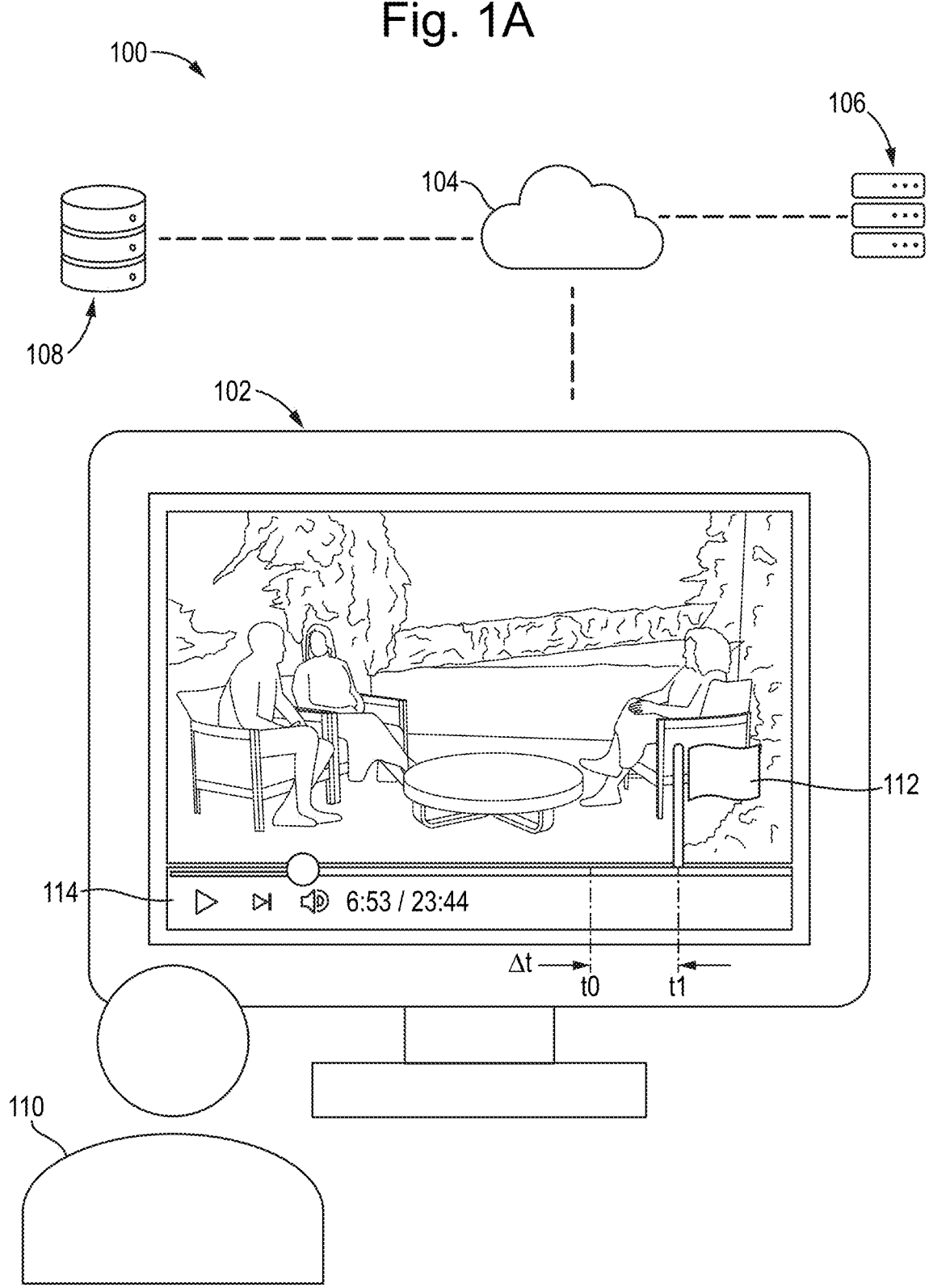
FIG. 1A illustrates an overview of a system displaying media content, in accordance with some examples of the disclosure.

FIG. 1 illustrates an overview of a system 100 for displaying media content, in accordance with some examples of the disclosure. In some examples, system 100 includes user equipment 102, such as a tablet computer, a smartphone, a smart television, or the like, configured to display media content to the user. System 100 may also include network 104, such as the Internet, configured to communicatively couple user equipment 102 to one or more servers 106 and/or one or more content databases 108 from which media content may be obtained for display on the user equipment 102. User equipment 102 and server 106 may be communicatively coupled to one another by way of network 108, and server 106 may be communicatively coupled to content database 108 by way of one or more communication paths, such as a proprietary communication path and/or network 104.

In some examples, system 100 may comprise an application that provides guidance through an interface, e.g., a graphical user interface, that allows users to efficiently navigate media content selections and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide modified subtitles for a content item being displayed to a user, e.g., based on subtitle data for a content item. For example, the application may provide the user with a selectable option for the display of modified subtitles that can improve the user's understanding of a content item displayed on user equipment 102.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
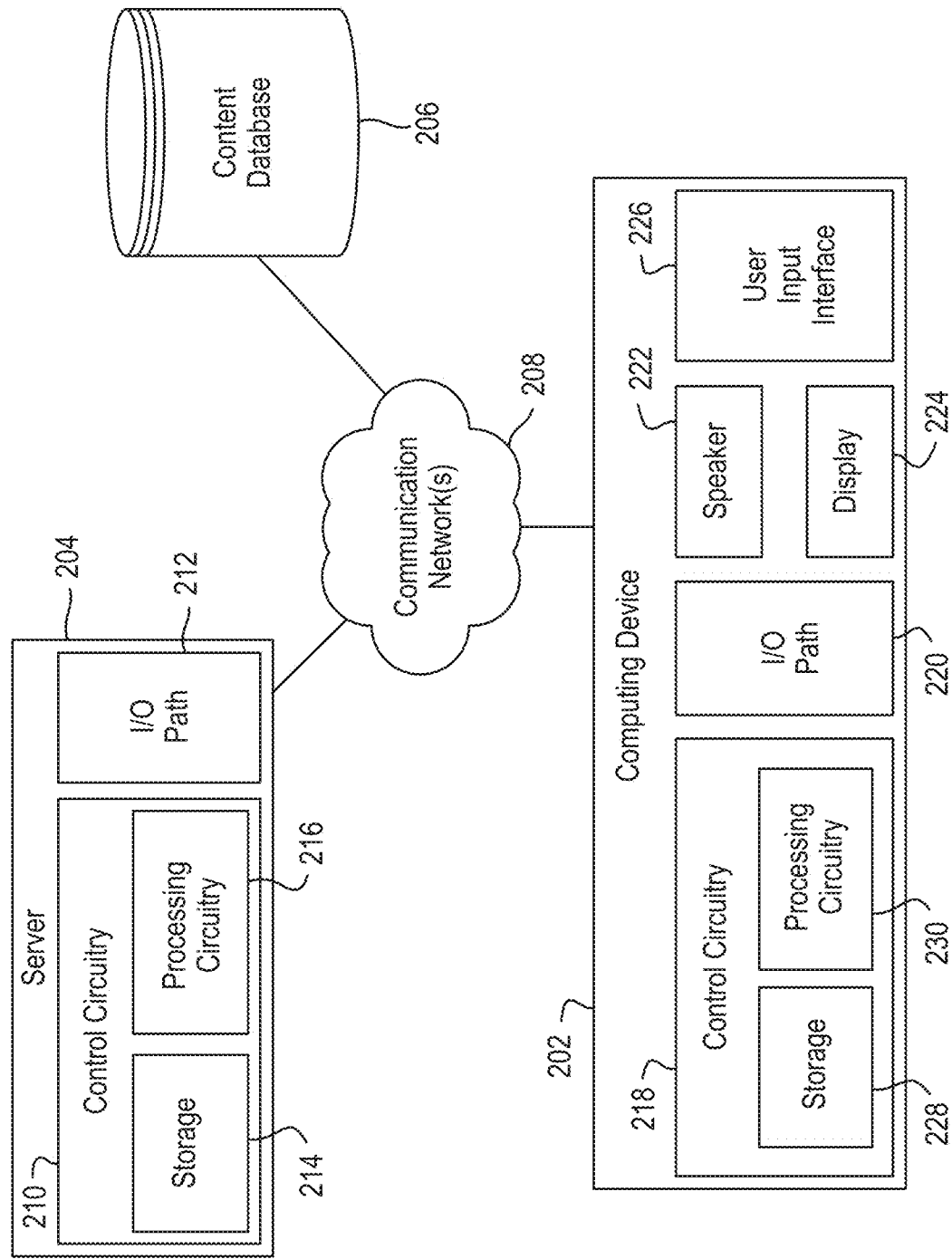
FIG. 2 is a block diagram showing components of an exemplary system for providing modified subtitles, in accordance with some examples of the disclosure.

FIG. 2 is an illustrative block diagram showing exemplary system 200 configured to display media content. Although FIG. 2 shows system 200 as including a number and configuration of individual components, in some examples, any number of the components of system 200 may be combined and/or integrated as one device, e.g., as user equipment 102. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to request modified subtitles, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 1B:
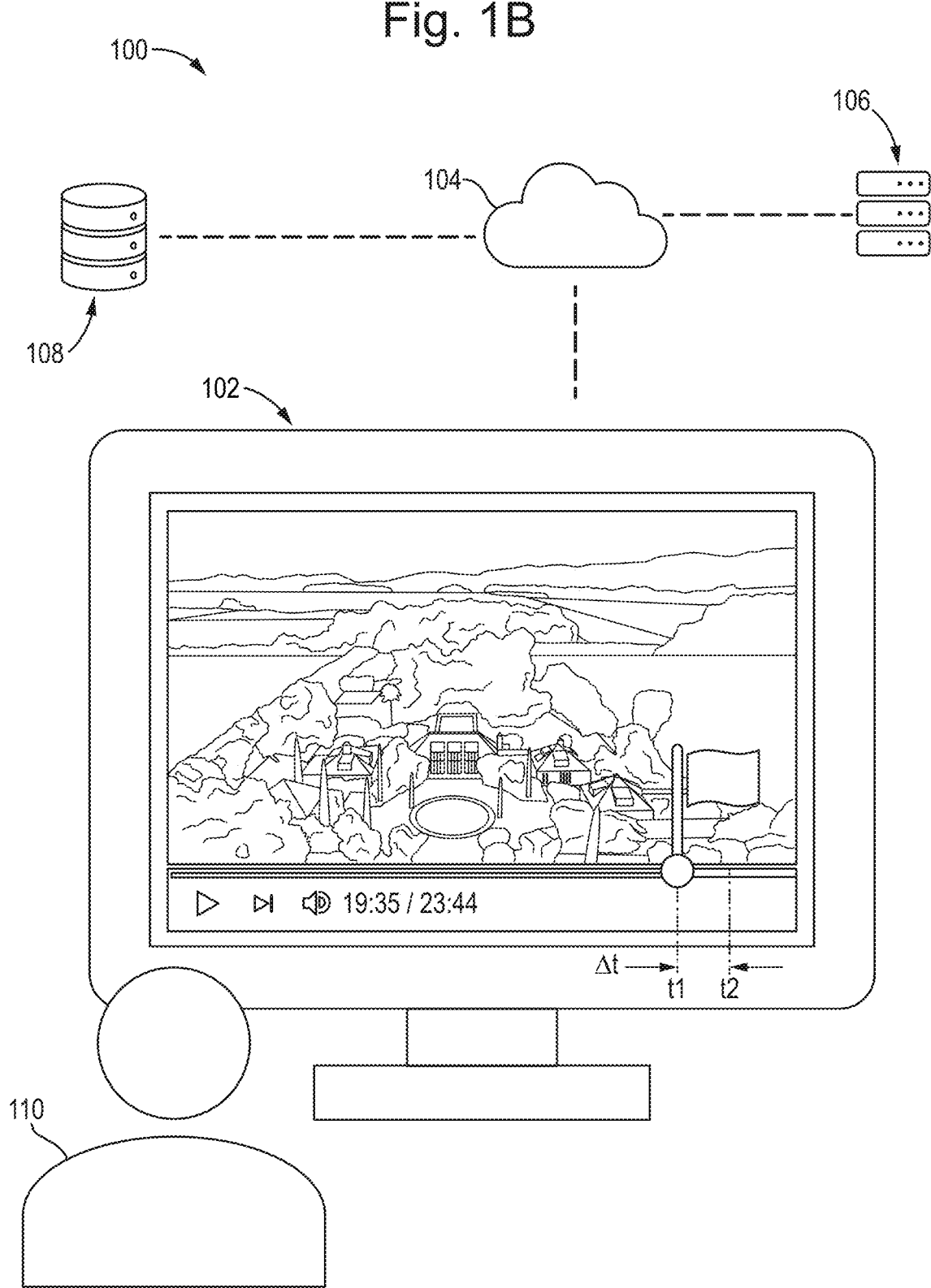
FIG. 1B illustrates the system of FIG. 1A in another operational state, in accordance with some examples of the disclosure.
Figure 3:
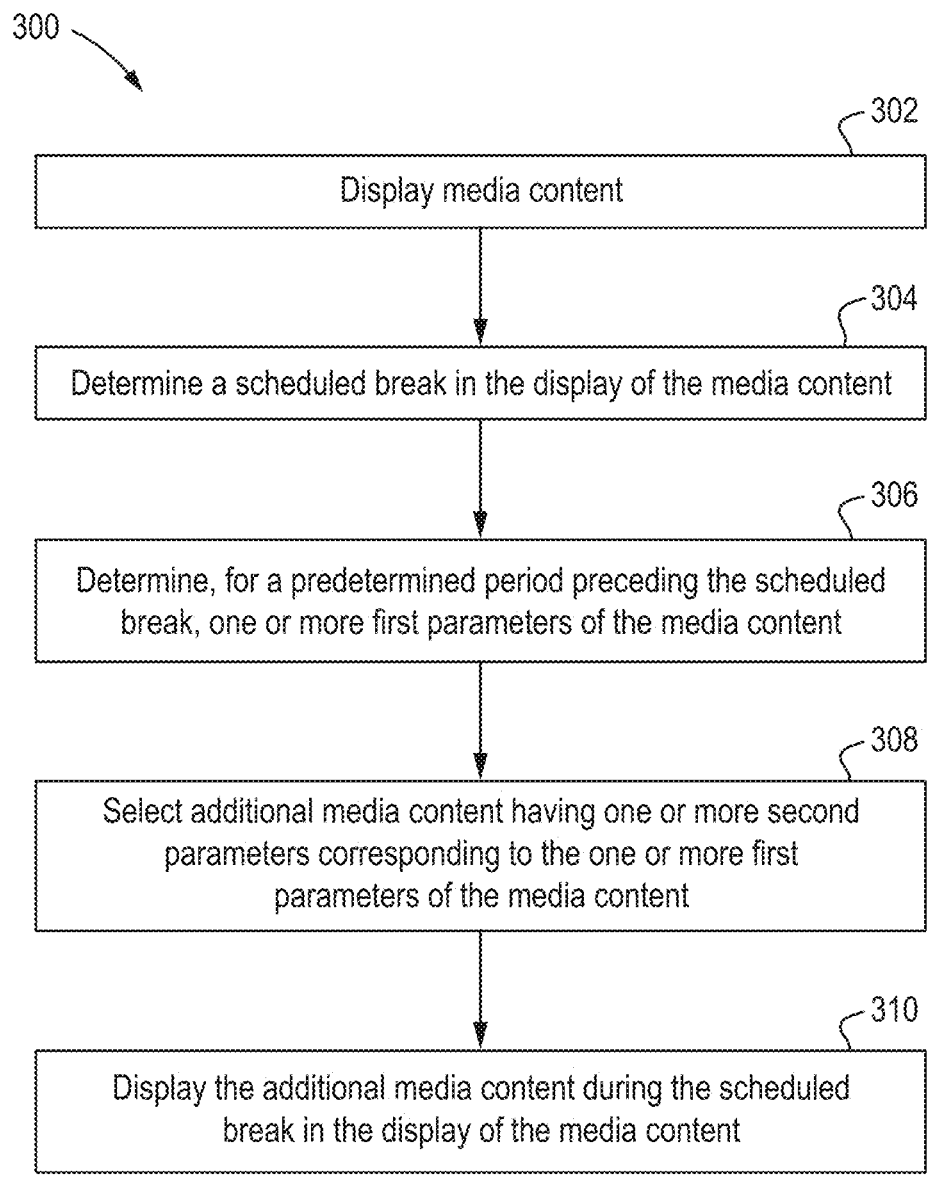
FIG. 3 is a flowchart representing a process for displaying media content, in accordance with some examples of the disclosure.

FIG. 3 is a flowchart representing an illustrative process 300 for displaying media content, in accordance with some examples of the disclosure. While the example shown in FIG. 3 refers to the use of system 100, as shown in FIGS. 1A and 1B, it will be appreciated that the illustrative process shown in FIG. 3, and any of the other following illustrative processes, may be implemented on system 100 and system 200, either alone or in combination, or on any other appropriately configured system architecture.

At step 302, media content, e.g., primary media content, is displayed on user equipment 102, e.g., using control circuitry of user equipment 102 and/or server 106. For example, control circuitry may be configured to allow user 110 to select and view media content using a content guidance application. In FIG. 1A, user 110 is partially through an interview scene comprising three seated individuals against a serene garden background. However, the scene may comprise any type of audio/visual characteristics. For example, the scene may be a portion of an action movie comprising a fast-paced car chase, and/or have any other appropriate type of audio/visual characteristics.

At step 304, control circuitry determines a scheduled break in the media content. For example, control circuitry may determine that the media content comprises a scheduled break at a predetermined time, and/or for a predetermined duration, during the display of the media content. In some examples, the content provider may provide metadata, in addition to and/or separately from, the transmission of the media content to indicate when, and the duration of, a break in the viewing of the media content is scheduled. In some examples, control circuitry of user device 102 may monitor one or more audio/visual characteristics of the media content to determine when a scheduled break will, or is likely to, occur. For example, control circuitry may determine whether the media content comprises a cue mark, which may be indicative of a scheduled break. Additionally or alternatively, control circuitry may determine that a scheduled break in imminent, e.g., by virtue of the display of a credits reel near the start or end of a program. In the example shown in FIG. 1A, control circuitry determines that a break in the media content is scheduled at t1, which is illustrated by flag 112 on progress bar 114. It is understood that the display of flag 112 and associated time markers, such as t1, are provided for the sake of illustration only to aid with the understanding of the present disclosure. However, this does not preclude their display to user 110 in some example of the present disclosure.

At step 306, one or more first parameters of the media content are determined for a predetermined period preceding the scheduled break, e.g., using control circuitry. For example, control circuitry may be configured to access metadata for the media content to determine one or more parameters of media content being displayed to user 110 during the predetermined period preceding the scheduled break, e.g., metadata may indicate at the program, scene or frame level the content being displayed to user 110. For example, metadata may indicate one or more parameters relating to the cast, location, type/style of background, type/style of audio, language, genre, and/or any other appropriate property of the media content communicable by virtue of metadata. Additionally or alternatively, control circuitry may be configured to monitor the media content for one or more audio/visual characteristics of the media content. For example, control circuitry may monitor the media content to determine a rate at which scenes change in the media content, and/or the type of scenes involved in a scene change. For example, control circuitry may be configured to determine that the media content is a fast-paced program based on a fast rate of change of one or more audio/visual characteristics of scenes and/or frames of the media content. In some examples, control circuitry may be configured to monitor one or more levels of audio and/or audio modulation of the media content. For example, control circuitry may determine that the media content comprises a low amount of speech and/or speech at a low pace and/or volume. In the example shown in FIG. 1A, the scene is an interview scene comprising a spoken exchange between an interviewer and two interviewees. As such, the cadence of the scene change is likely to be low, e.g., compared to an action movie. However, the tone, e.g., the emotional tone, of the interview may not be wholly apparent from the metadata for the media content. For example, the interview may comprise one or more segments having different characteristics, such as a funny segment and a sad segment. As such, control circuitry may be configured to determine the type, e.g., the mood, of the media content based on one or more audio/visual parameters, such as facial expressions of one or more of the individuals in the scene and/or the language spoken by one or more of the individuals in the scene.

In the example shown in FIG. 1A, the timing of the scheduled break in the media content is determined, e.g., using control circuitry of user equipment 102. For example, control circuitry may determine a timestamp associated with the scheduled break. In the example shown in FIG. 1A, control circuitry determines that the scheduled break occurs at t1, shown by flag 112. Control circuitry then determines the one or more first parameters associated with the media content for a predetermined period before the scheduled break, e.g., before the start of the scheduled break. For example, the predetermined period before the scheduled break may be set to any appropriate period, such as 10 seconds, 1 minute, 10 minutes, or the period between the start of the program and the start of the scheduled break. The determination of the duration of the predetermined period before the scheduled break is described below in more detail in relation to the example of FIG. 4. In the example shown in FIG. 1A, the predetermined period before the scheduled break is indicated by Δt, e.g., the time between t0, which indicates the start of the predetermined period before the scheduled break, and t1, which indicates the start of the scheduled break. In this manner, control circuitry determines one or more parameters of the media content in the period leading up to the scheduled break.

At step 308, additional media content having one or more second parameters corresponding to the one or more first parameters of the media content is selected, e.g., from memory using control circuitry. For example, control circuitry may access storage and select, from a selection of multiple additional media content items, one or more additional media content items that have one or more second parameters that match, e.g., within a predetermined threshold level, the one or more first parameters of the media content displayed to user 110 in the period preceding the scheduled break. In some example, selection of the additional media content may be made ahead of the time of viewing of the media content by user 110. For example, control circuitry may determine, e.g., as a background processing operation, the one or more parameters of the media content for the period preceding the scheduled break. As such, control circuitry may pre-select, e.g., prior to user 110 starting the viewing of media content, which additional content to display during the scheduled break. However, in some examples, determination of the one or more first parameters and/or selection of the additional media content may be made in near-real time, or real time, e.g., as user 110 watches the program.

At step 310, the additional media content is displayed during the scheduled break in the display of the media content. In the example shown in FIG. 1B, the user has progressed to a point in the media content where the scheduled break occurs, e.g., t=t1. During the scheduled break, additional content corresponding to the type of media content being viewed by user 110 prior to the scheduled break is displayed. For example, control circuitry has selected additional content having similar parameters, e.g., audio/visual characteristics, to the media content, which in this case is a scene of landscape corresponding to the characteristics of the background of the interview scene shown in FIG. 1A. In some examples, the choice of the additional media content is made to maintain a consistent viewing experience, which may assist in maintaining the attention of the user and/or reduce the possibility that the user will request to skip viewing the additional content. For example, it may be undesirable to display a fast-paced action scene as part of the additional content when the media content is a slow-paced, emotional scene, since displaying mis-matched content may reduce the quality of the overall viewing experience by the user. In some examples, additional media content may be an advertisement for something in, related to and/or mentioned in the period of the media content preceding the scheduled break. As such, the processes described herein assist in maintaining the viewer's interest in the commercial, since the general tone and feel of the viewing experience are not compromised by the placement of an ad in the media content.

The actions or descriptions of FIG. 3 may be used with any other example of this disclosure, e.g., the example described below in relation to FIG. 4. In addition, the actions and descriptions described in relation to FIG. 3 may be done in any suitable alternative orders or in parallel to further the purposes of this disclosure.

Figure 4:
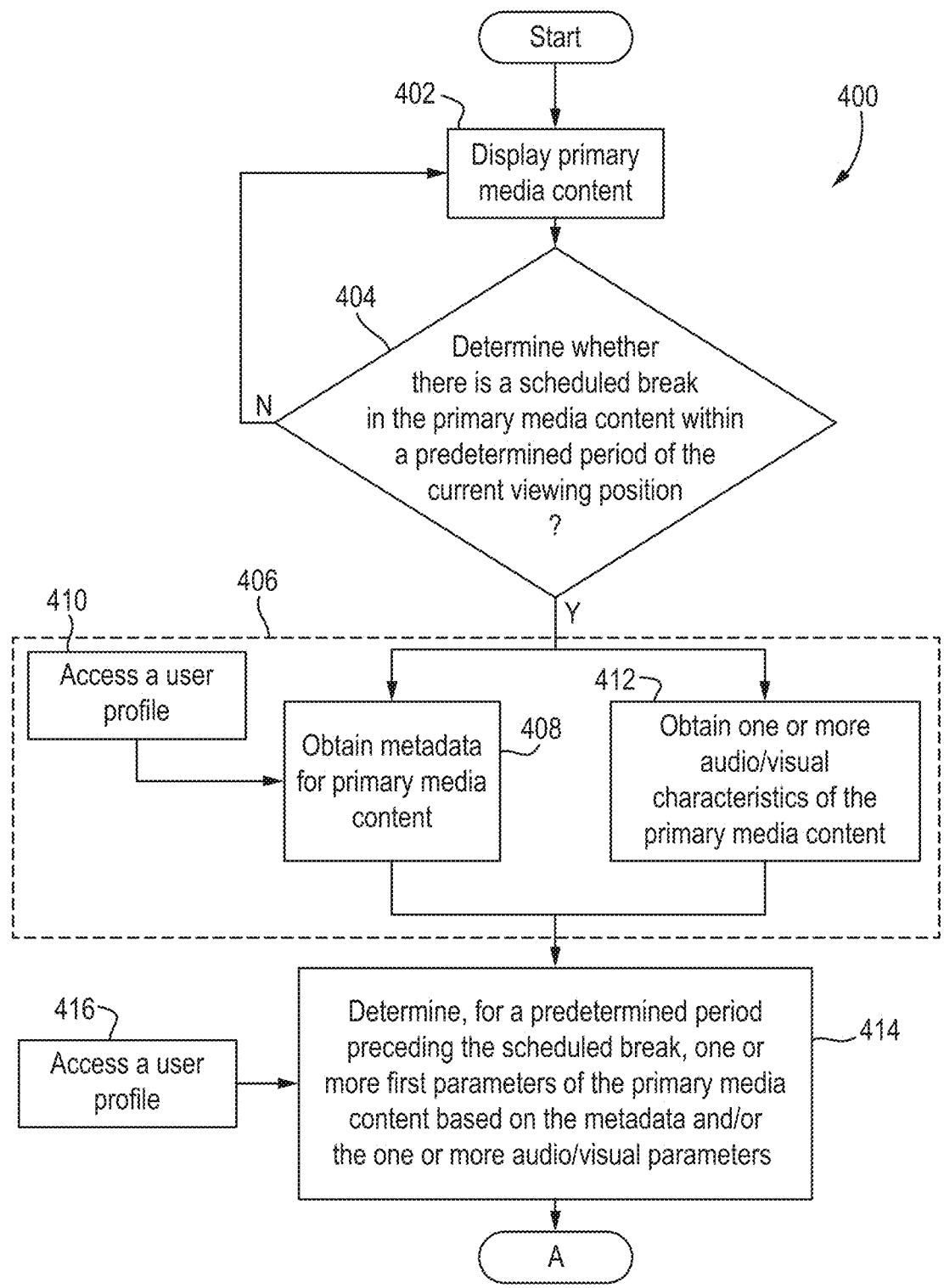
FIG. 4 is a flowchart representing a process for displaying first and second additional media content during the display of primary media content, in accordance with some examples of the disclosure.

FIG. 4 shows a flowchart representing an illustrative process for displaying first and second additional media content during the display of primary media content. While the example shown in FIG. 4 refers to the use of system 100, as shown in FIG. 1, it will be appreciated that the illustrative process shown in FIG. 4 may be implemented on system 100 and system 200, either alone or in combination, or on any other appropriately configured system architecture.

At step 402, primary media content is displayed on user equipment 102, e.g., in a similar manner to step 302.

At step 404, control circuitry determines whether there is a scheduled break in the primary media content within a predetermined period of the current viewing position, e.g., within 1 minute, 5 minutes, or any appropriate time scale ahead of the current viewing position of user 110. For example, control circuitry may monitor a schedule of planned breaks in a transmission of a program and compare the schedule of planned breaks to the current viewing position of user 110. Where it is determined that there is not a scheduled break in the primary media content within the predetermined period of the current viewing position, process 400 returns to step 402, which reduces the operational demand on control circuitry. Where it is determined that there is a scheduled break in the primary media content within the predetermined period of the current viewing position, process 400 moves to step 406.

At step 406, one or more parameters of the media content are obtained, e.g., for a predetermined period preceding the scheduled break. Step 406 comprises at least steps 408, 410 and 412.

At step 408, metadata for the primary media content is obtained, e.g., using control circuitry. For example, metadata relating to the primary media content may be transmitted, e.g., separately from and/or along with the primary media content, to user equipment 102. Metadata may be any appropriate type of metadata, such as information regarding the cast, popularity, production date, content of a scene or frame, e.g., a location or article in the scene or frame, and/or any other appropriate type of information relating to the primary media content. In some examples, control circuitry may request metadata, e.g., specific metadata, relating to the primary media content from one or more sources of metadata. For example, control circuitry may access a user profile at step 410 to determine one or more user preferences, such as preferred actors, locations, interests, languages, etc. In some examples, the obtained metadata, and/or the request for metadata, may be filtered based on the user profile. In this manner, metadata relating to topics or categories in which user 110 has no or little interest may be disregarded for the purpose of process 400.

At step 412, one or more audio/visual characteristics of the primary media content are obtained. In some examples, control circuitry may request, from one or more sources, such as a content provider, one or more audio/visual characteristics of the primary media content. Additionally or alternatively, control circuitry may be configured to perform one or more sound/image processing techniques to determine one or more audio/visual properties, and/or a change in one or more audio/visual properties, of the primary media content. While step 406 is shown as occurring dependent from step 404 in FIG. 4, it is understood that step 406 may occur at any appropriate time. For example, step 406 may occur in response to user 110 selecting primary media content for display and/or scheduling primary media content for recording. In some examples, step 408 and/or step 410 may occur based on, e.g., based solely on, the user profile being updated, either by user 110 or automatically as a result of an action of user 110.

At step 414, one or more first parameters of the primary media content are determined, e.g., for a predetermined period preceding a scheduled break in the primary media content, based on the metadata and/or the one or more audio/visual parameters obtained in steps 408 and 410. For example, control circuitry may construct a list of one or more first parameters of the primary media content for the predetermined period preceding the scheduled break in the primary media content. In some examples, at step 416 a user profile is access to assist in carrying out step 414. For example, a user profile may indicate a preferred duration of the predetermined period preceding the scheduled break. Additionally or alternatively, the duration of the predetermined period preceding the scheduled break may be set by a content provider. For example, metadata regarding the duration of the predetermined period preceding the scheduled break may be transmitted to user equipment 102, such that user equipment 102 can set the duration of the predetermined period preceding the scheduled break, e.g., upon user selection to view the primary media content. For example, a first type of media content, such as the media content shown in FIG. 1A, may comprise similar content throughout the duration of the media content, and a second type of media content may comprise different content throughout the duration of the media content. As such, in the case of the example shown in FIG. 1A, a shorter duration of the predetermined period preceding the scheduled break may be more appropriate compared to that for a second type of media content, such as an action movie.

In some examples, the user profile may be accessed at step 416 to add a weighting to a list of determined first parameters of the primary media content for the predetermined period preceding the scheduled break. For example, the user profile may indicate that the user has a greater interest in a certain actor compared to another actor (which they might also be interested in, just to a lesser extent). As such, at step 414, the list of determined first parameters may be ranked based on information in the user profile.

At step 418, control circuitry determines whether a first parameter threshold has been met. For example, the first parameter threshold may be set to ensure that process 400 is carried out to an acceptable level, e.g., by adequately matching additional content to primary media content during the scheduled break to maintain the quality of a user's viewing experience. In other words, step 418 is carried out as a quality control step to ensure enough data regarding the one or more first parameters is available as the basis for the selection of additional media content. Where the first parameter threshold has not been met, process 400 moves to steps 420 and 422. Where the first parameter threshold has been met, process 400 moves to step 424.

At step 420, the start time of the scheduled break is delayed, e.g., as a result of not enough first parameter data being available for the first parameters to meet the first parameter threshold. For example, a user profile may have been accessed at step 416, and used to filter, e.g., by limiting the metadata and/or audio/visual characteristics of the primary media content that can be used to determine the one or more first parameters of the primary media content. In such a case, the predetermined period preceding the scheduled break may not comprise media content having any or enough metadata and/or audio/visual characteristics relating to the filtered choices to satisfy the first parameter threshold.

At step 422, the primary media content continues to be displayed to the user and control circuitry continues to determine one or more first parameters. Steps 418, 420 and 422 operate in a feedback loop until the first parameter threshold has been met, at which point process 400 moves to step 424.

At step 424, one or more third parameters of the primary media content are determined for a predetermined period following the scheduled break, e.g., period Δt=t1 to t2, as shown in FIG. 1B. The one or more third parameters are determined in a manner similar to the determination of the one or more first parameters. For example, metadata and/or one or more audio/visual characteristics of the primary media content obtained at steps 408 and 410 may be used to determine the one or more third parameters for the predetermined period following the scheduled break. Additionally or alternatively, a user profile may be accessed, e.g., at step 426, to add weighting to determine one or more third parameters, e.g., to produce a ranked list of third parameters. Optionally, although not shown in FIG. 4, steps relating to determining whether a third parameter threshold has been met may be implemented in process 400 in a similar manner to steps 418, 420 and 422.

At step 428, one or more media content items having one or more second parameters corresponding to one or more first and/or third parameters of the primary media content are requested. For example, control circuitry may request, from one or more content providers, media content items, e.g., additional media content items (including but not limited to content such as a trailer and/or a commercial), having similar parameters to the predetermined period of the primary media content preceding the scheduled break and/or the predetermined period of the primary media content following the scheduled break. In some examples, control circuitry may request, from one or more content providers, a plurality of additional media content items, a first additional media content item having one or more second parameters corresponding to the one or more first parameters of the predetermined period of the primary media content preceding the scheduled break, and a second additional media content item having one or more second parameters corresponding to the one or more first parameters of the predetermined period of the primary media content following the scheduled break. In some cases, control circuitry may request that the second parameters of the first additional media content item are within a threshold limit of the second parameters of the second additional media content item.

At step 430, one or more second parameters for at least one additional media content item are received, e.g., by control circuitry of user equipment 102. For example, a content provider may transmit to user equipment 102 a manifest of additional media content items that may have one or more second parameters that i) match the one or more first and/or third parameters, or ii) correspond to the one or more first and/or third parameters. In some examples, the manifest may contain a price associated with each of the additional media content items listed in the manifest. For example, an additional media content item that exhibits a strong correlation between the one or more second parameters and the one or more first and/or third parameters may be priced at a higher level than another additional media content item that exhibits a weaker correlation between the one or more second parameters and the one or more first and/or third parameters.

At step 432, control circuitry determines whether any of the additional media content items listed in the manifest have one or more second parameters that correspond, e.g., correlate, to the one or more first and/or third parameters. In some examples, the level of correlation may be set by a user. For example, a user may indicate in a user profile the amount by which the one or more second parameters of the additional media content item may deviate from an exact correlation with the one or more first and/or third parameters. As such, process 400 may comprise step 434, in which a user profile is accessed to determine an allowable level of correlation. Where it is determined that at least one of the additional media content items listed in the manifest have one or more second parameters that correspond to the one or more first and/or third parameters by a certain amount, process 400 moves to steps 436 and (optionally) 438. Where it is determined that none of the additional media content items listed in the manifest have one or more second parameters that correspond to the one or more first and/or third parameters by a certain amount, process 400 returns to step 428 where further additional media content items are requested.

At step 436, transmission of at least one first additional media content item having one or more second parameters that correspond to the one or more first parameters is requested, e.g., by control circuitry of user equipment 102. For example, control circuitry may request transmission of a first additional media content item having the greatest level of correlation between the one or more second parameters and the one or more first parameters. Alternatively, in some examples, control circuitry may request transmission of a first additional media content item having a lower level of correlation between the one or more second parameters and the one or more first parameters, and that is priced at a lower level than another second additional media content item having a higher level of correlation between the one or more second parameters and the one or more first parameters.

At step 438, transmission of at least one second additional media content item having one or more second parameters that correspond to the one or more third parameters is requested, e.g., by control circuitry of user equipment 102. For example, control circuitry may request transmission of a second additional media content item having the greatest level of correlation between the one or more second parameters and the one or more first parameters. Alternatively, in some examples, control circuitry may request transmission of a second additional media content item having a lower level of correlation between the one or more second parameters and the one or more third parameters, and that is priced at a lower level than another second additional media content item having a higher level of correlation between the one or more second parameters and the one or more third parameters.

At step 440, the first media content item is selected as additional media content, e.g., first additional media content, to be displayed during the scheduled break.

At step 442, the second media content item is selected as additional media content, e.g., second additional media content, to be displayed during the scheduled break.

At step 444, the display of primary media content pauses and the scheduled break starts, e.g., at t=t1.

At step 446, the first additional media content is displayed during the scheduled break in the display of the primary media content. In some examples, the first additional media content is displayed following on directly from the display of the primary media content.

At step 448, the second additional media content is displayed after the first additional media content during the scheduled break in the display of the primary media content. In some examples, the second additional media content is displayed following on directly from the display of the first additional media content.

At step 450, after the scheduled break, the display of the primary media content recommences.

The above process is beneficial as it matches the context of additional media content that interrupts primary media content to the context of the primary media content. For example, in response to a scheduled break being in the primary media content being identified, control circuitry, e.g., control circuitry of user equipment 102, can request additional media content having a similar look and feel to the portion of the primary media content that precedes and/or follows the display of the additional content during the scheduled break, which can help maintain a more consistent viewing experience, and reduce the risk of a user requesting to skip the display of additional content.

The actions or descriptions of FIG. 4 may be used with any other example of this disclosure. In addition, the actions and descriptions described in relation to FIG. 4 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting media content at a server, comprising:
   transmitting the media content for display on a user equipment;
   identifying a time period preceding a scheduled break in the display of the media content;
   determining, for the time period preceding the scheduled break, one or more first parameters of the media content;
   adjusting the start time of the scheduled break based on the one or more first parameters;
   in response to adjusting the start time of the scheduled break, continuing to determine the one or more first parameters of the media content;
   selecting an additional media content having one or more second parameters corresponding to at least one of the one or more first parameters of the media content; and
   transmitting the additional media content during the scheduled break in the display of the media content.

2. The method of claim 1, further comprising:
   obtaining metadata for the media content, wherein the one or more first parameters of the media content are based on the metadata.

3. The method of claim 1, further comprising:
   determining one or more audio and/or visual characteristics of the media content, wherein the one or more first parameters of the media content are based on the one or more audio and/or visual characteristics.

4. The method of claim 1, wherein the additional media content is selected in response to the number of one or more first parameters reaching a first parameter threshold.

5. The method of claim 1, further comprising accessing a user profile, wherein selecting the additional media content is based on the user profile.

6. The method of claim 5, wherein selecting the additional media content based on the user profile comprises:
   determining, based on the user profile, a weighting of the one or more first parameters; and
   selecting the additional media content having the one or more second parameters corresponding to the weighing of the one or more first parameters.

7. A system for selecting media content at a server, comprising:
   input/output circuitry configured to:

transmit the media content for display on a user equipment;
control circuitry configured to:
identify a time period preceding a scheduled break in the display of the media content;
determine, for the time period preceding the scheduled break, one or more first parameters of the media content;
adjust the start time of the scheduled break based on the one or more first parameters;
in response to adjusting the start time of the scheduled break, continue to determine the one or more first parameters of the media content;
select an additional media content having one or more second parameters corresponding to at least one of the one or more first parameters of the media content; and
wherein the input/output circuitry is further configured to:
transmit the additional media content during the scheduled break in the display of the media content.

8. The system of claim 7, wherein the control circuitry is further configured to:
obtain metadata for the media content, wherein the one or more first parameters of the media content are based on the metadata.

9. The system of claim 7, wherein the control circuitry is further configured to:
determine one or more audio and/or visual characteristics of the media content, wherein the one or more first parameters of the media content are based on the one or more audio and/or visual characteristics.

10. The system of claim 7, wherein the control circuitry is configured to:
select the additional media content in response to the number of one or more first parameters reaching a first parameter threshold.

11. The system of claim 7, wherein the control circuitry is further configured to:
access a user profile, wherein selecting the additional media content is based on the user profile.

12. The system of claim 11, wherein the control circuitry is configured to select the additional media content based on the user profile by:
determining, based on the user profile, a weighting of the one or more first parameters; and
selecting the additional media content having the one or more second parameters corresponding to the weighing of the one or more first parameters.

13. A non-transitory computer readable medium for selecting media content at a server, comprising:
instructions that when executed by input/output circuitry cause the input/output circuitry to:
transmit the media content for display on a user equipment;
instructions that when executed by control circuitry cause the control circuitry to:
identify a time period preceding a scheduled break in the display of the media content;
determine, for the time period preceding the scheduled break, one or more first parameters of the media content;
adjust the start time of the scheduled break based on the one or more first parameters;
in response to adjusting the start time of the scheduled break, continue to determine the one or more first parameters of the media content;
select an additional media content having one or more second parameters corresponding to at least one of the one or more first parameters of the media content; and
further comprising instructions that when executed by the input/output circuitry cause the input/output circuitry to:
transmit the additional media content during the scheduled break in the display of the media content.

14. The non-transitory computer readable medium of claim 13, further comprising instructions that when executed by the control circuitry cause the control circuitry to:
obtain metadata for the media content, wherein the one or more first parameters of the media content are based on the metadata.

15. The non-transitory computer readable medium of claim 13, further comprising instructions that when executed by the control circuitry cause the control circuitry to:
determine one or more audio and/or visual characteristics of the media content, wherein the one or more first parameters of the media content are based on the one or more audio and/or visual characteristics.

16. The non-transitory computer readable medium of claim 13, further comprising instructions that when executed by the control circuitry cause the control circuitry to:
select the additional media content in response to the number of one or more first parameters reaching a first parameter threshold.

17. The non-transitory computer readable medium of claim 13, further comprising instructions that when executed by the control circuitry cause the control circuitry to:
access a user profile, wherein selecting the additional media content is based on the user profile.

18. The non-transitory computer readable medium of claim 17, wherein the instructions that cause the control circuitry to select the additional media content based on the user profile cause the control circuitry to:
determine, based on the user profile, a weighting of the one or more first parameters; and
select the additional media content having the one or more second parameters corresponding to the weighing of the one or more first parameters.

* * * * *